Aug. 14, 1962     D. W. DAVIS     3,049,616
PERFORATED LIGHTING DIFFUSER
Filed March 6, 1958
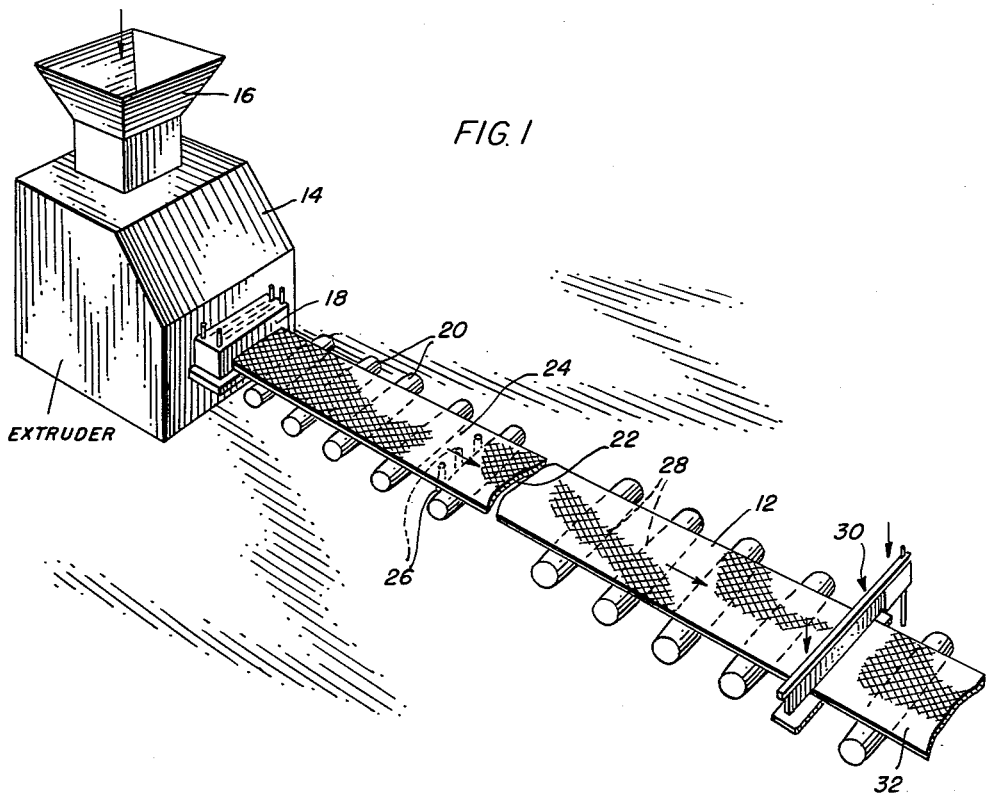
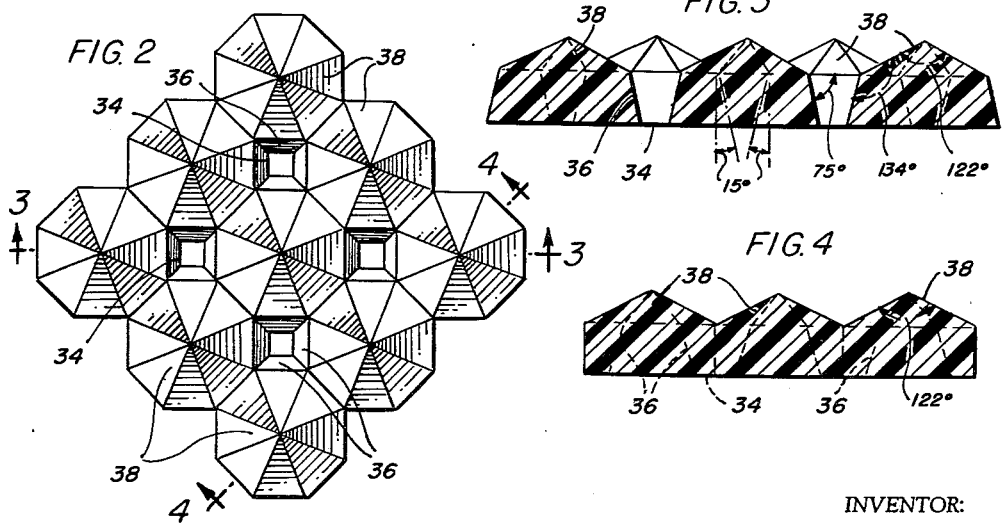
INVENTOR:
DONALD W. DAVIS
BY
Kent W. Connell
ATT'Y

United States Patent Office 3,049,616
Patented Aug. 14, 1962

3,049,616
PERFORATED LIGHTING DIFFUSER
Donald W. Davis, Highland Park, Ill., assignor to Lighting Products, Inc., Highland Park, Ill., a corporation of Illinois
Filed Mar. 6, 1958, Ser. No. 719,642
3 Claims. (Cl. 240—106)

This invention relates in general to a plastic diffuser with perforations therethrough preferably made of a clear plastic by an extrusion process and particularly designed for use for an electric lamp lighting diffuser although it may have a more general use wherever applicable.

Diffusers of this kind, particularly with perforations, have not previously been made by an extrusion process and the present invention made of plastic material is particularly desirable as it is particularly expensive to produce molds for making similar perforated diffusers with light diffusing surfaces and highly unsatisfactory to obtain the correct diffusion angles in the material and the perforations through the material as herein set forth.

An important object of the invention is to produce a perforated lighting diffuser of clear plastic with an angular diffusing pattern on one surface and perforations extending through the material by extruding powdered plastic materials in a continuous thin sheet.

A further object of the invention is to provide a plastic diffuser made in a continuous sheet with openings therethrough and a diffusing angular pattern on one side and curving the material transversely of its direction of extrusion with a slight concave curve in the pattern side.

A further object of the invention is to produce a perforated lighting diffuser of plastic material having a pattern of openings therethrough, plane on one side and having an angular diffusing pattern between the perforations on the other side.

Still a further object of the invention is to provide a perforated lighting diffuser of clear plastic, plane on one side, with angular openings extending through the plastic, with an angular pattern on one side of the plastic connected by angular diffusing planes at the sides of the openings through the plastic.

A still further object of the invention is to provide a perforated lighting diffuser of plastic material having regular square openings through the diffuser with sides extending at an angle from one side of the diffuser to the other and an eight-sided pyramidal projection extending upwardly above the plane of the said other side of the diffuser.

Other objects of the invention will appear in the specification and will be apparent from the accompanying drawing in which, FIG. 1 is a perspective view representing somewhat diagrammatically the method of extruding a continuous strip or sheet of a plastic perforated diffuser of this kind which is slightly curved transversely and cut off in desired lengths.

FIG. 2 is a fragmentary plan or face view of a perforated diffuser pattern having rectangular openings with beveled sides and regular octagonal pyramidal tops.

FIG. 3 is a sectional view of a fragment as shown in FIG. 2 on the line 3—3 thereof; and FIG. 4 is a sectional view of the fragment shown in FIG. 2 on the line 4—4 thereof.

It was heretofore considered necessary to cast or mold plastic sheet constructions of this kind, particularly those having perforations therein. The molds are provided for limited sectional pieces or areas, the molds are relatively very expensive and the production rate is relatively slow. By producing a ribbon or strip of plastic material of the order of two feet in width using polystyrene and methyl methaculate and like powders with suitable dies in the extruder, a continuous sheet of perforated material having a desired pattern and including perforations through the sheet may be produced at a rapid rate. The exact method, dies, and apparatus for extruding this product constitutes no part of this invention which depends upon the perforations and the specific angles of the reflecting and refracting surfaces which make up the accurately described pattern.

In the method of producing a continuous sheet of thin material of this kind, it is found desirable to slightly curve the ribbon or sheet transversely of its length and concavely from the pattern side thereof, and after the extruded portion has sufficiently set or hardened, it is cut off in desired length for convenient handling and use.

Referring now more particularly to the drawings, a continuous strip or sheet 12 of a perforated diffuser construction in accordance with this invention is discharged from a suitable extruder 14 having an inlet or hopper 16 for receiving the material of which the sheet is made and having suitable mechanism including an exit die 18 through which the sheet is expelled.

In discharging the sheet 12 of extruded material, which is of suitable width such as 24 inches with a thickness of 135 thousandths of an inch, it is necessary to support it continuously for a time until the material sufficiently sets or hardens and for this reason, a conveyor represented by rollers 20 extends in front of the extruder for a sufficient distance.

In order to suitably support and reinforce the sheet 12 as it is extruded and for subsequent use, it is arched or curved slightly at right angles to its longitudinal movement transversely of the sheet in an arc 22 concave at the under side of the extruded sheet with a radius of the order of two times or more of the width of the sheet which is at the bottom in FIG. 1, the upper or exposed side 24 being clear and plane. To cause this curvature, a series of blowers having nozzles 26 are arranged transversely of the path of the sheet 12 at the under side thereof and in the conveyor as represented by their position between the rollers 20 so that the sheet is extruded and carried by the conveyor, the nozzles will discharge air or gas upwardly against the under surface of the sheet, cooling it and curving it to form the slight arc 22 of transverse curvature.

After passing this means for producing the curvature, rollers 28 of the conveyor may be shaped to maintain this curvature while the plastic sheet has further hardened or set and after progressing to a suitable point, the strip 12 is severed transversely by a cutter 30 operated either manually or automatically to cut off a piece 32 of desired length, a regular length for convenient handling being approximately 48" long.

The diffuser pattern here shown comprises openings 34, approximately 4 hundredths of an inch at the plane or clear face and 8²⁄₁₀₀ of an inch at the opposite face with inclined sides 36 which are beveled at an angle of 15° and extend 8 hundredths of an inch to the opposite face of the plastic sheet where the sides are of a length of approximately 8²⁄₁₀₀ of an inch. From these sides, octagonal pyramids 38 extend upwardly for a distance of 55 thousandths of an inch and at an angle of 134° from the sides 36, the angle of the pyramidal cone between diagonally opposite sides thereof being approximately 122°, and the angles of the sides 36 and the sides of the pyramids being progressive in the same direction so that the dies of the extruder can be removed freely from the plastic material without damaging it in forming the openings and projections of the diffuser plate.

Thus an accurate pattern of pyramidal projections and square openings through a material is produced which has a multiple of diffusing angular facets and sides completely occupying the space at the diffusing side of the sheet and arranged in regular order, the octagonal pyramids connecting preferably with the holes which is not true of hexagonal and other patterns, which of themselves fit tightly together.

Plastic panels of this construction are highly desirable for use with lighting fixtures, particularly that type in which lamps are located at one side of a plastic transparent pattern, usually enclosed in a rectangular or other casing and producing a diffused illumination at the other or outer side of the casing or fixture. This construction has the advantage that it is much cooler in operation than entirely closed panels, that is, without the perforations or openings therethrough, the plastic material is light and with the openings causes a change of air in the fixture itself and contributes to the circulation of air in a room in which such a fixture is used.

Instead of being entirely clear, transparent material, it may also be slightly tinted or colored by introducing suitable coloring matter in the plastic as it is extruded. By forming the plastic with a slight arc therein transversely of its length, the sides of the panel being usually supported, will tend to flatten this arc as the plastic sheet is used which will support the diffuser in substantially flat condition in actual use.

While this lighting diffuser has been particularly described as desirable for use in connection with electric fixtures, it may have a more general use as a light diffuser wherever used, the projections and openings provide a pleasing pattern and the openings allow a limited transfer of air through the material itself.

While an improved perforated diffuser and the method of making it by extrusion has been described in some detail, the invention should be regarded by way of an illustration and example rather than a restriction or limitation thereof, as many changes in the construction, combination and arrangement of the parts may be made without departing from the spirit and scope of the invention.

I claim:

1. A light diffuser plate having a base with square openings therethrough smooth on one side and pyramidal projections entirely surrounding the openings and projecting from the other side of the base, the openings extending and inclined outwardly in the same directions as the surrounding faces of the pyramidal projections but to a less degree, the sides of the opening in the base being tapered outwardly to the base edges of the said pyramidal projections, and the sides of the pyramids being continued therefrom and tapered to a greater extent than the sides of the openings in the base, the sides of the openings in the base being tapered about 15° from the bottom to the top through the plate, and the pyramidal sides being inclined about 134° from a vertical edge at the opening of each corresponding tapered side.

2. A light diffuser plate having a base with square openings therethrough smooth on one side and pyramidal projections entirely surrounding the openings and projecting from the other side of the base, the openings extending and inclined outwardly in the same directions as the surrounding faces of the pyramidal projections but to a less degree, the apex of the pyramidal projections between its opposite sides are at an angle of about 122° from a vertical through the apex and the height of the apex projections is less than the corresponding height of the apertured base portion of the plate containing the said openings.

3. An extruded light diffuser plastic plate having a base smooth on one side with pyramidal projections extending from the other side to a number of common peaks and a plurality of angular openings between the pyramidal projections through the base of the plate having the sides of said openings inclined in the same direction as the outer faces of the pyramidal projections, the sides of the openings being inclined outwardly at one side of the plate, and the sides of the pyramidal projection being inclined outwardly at progressively increased angles so that the plate may be removed at one side of an extruder die, each opening through the plate being about $4/100$ of an inche square at its smaller end in the plane face of the plate and about $82/100$ of an inch square at its large end, and the pyramids being octagonal and the length of each side at its base being approximately $82/100$ of an inch.

References Cited in the file of this patent

UNITED STATES PATENTS

| 167,921 | McLewee | Sept. 21, 1875 |
| 2,904,673 | Guth | Sept. 15, 1959 |

FOREIGN PATENTS

| 617,131 | Great Britain | Feb. 1, 1949 |